(12) United States Patent
Morita et al.

(10) Patent No.: US 9,975,563 B2
(45) Date of Patent: May 22, 2018

(54) VEHICLE CONTROL DEVICE, TRANSPORT SYSTEM, VEHICLE CONTROL METHOD, AND PROGRAM

(71) Applicant: MITSUBISHI HEAVY INDUSTRIES, LTD., Tokyo (JP)

(72) Inventors: Katsuaki Morita, Tokyo (JP); Hiroyuki Kono, Tokyo (JP); Masaya Mitake, Tokyo (JP); Yasuyuki Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 15/126,120

(22) PCT Filed: Dec. 15, 2014

(86) PCT No.: PCT/JP2014/083110
§ 371 (c)(1),
(2) Date: Sep. 14, 2016

(87) PCT Pub. No.: WO2015/145892
PCT Pub. Date: Oct. 1, 2015

(65) Prior Publication Data
US 2017/0072974 A1    Mar. 16, 2017

(30) Foreign Application Priority Data
Mar. 25, 2014 (JP) .................... 2014-061917

(51) Int. Cl.
*B61L 27/04* (2006.01)
*B61L 15/00* (2006.01)
(Continued)

(52) U.S. Cl.
CPC ............... *B61L 27/04* (2013.01); *B60L 9/02* (2013.01); *B60L 11/1805* (2013.01);
(Continued)

(58) Field of Classification Search
CPC .. B61L 27/04; B61L 27/0027; B61L 15/0072; B61L 15/0081; B61L 27/0077
(Continued)

(56) References Cited

U.S. PATENT DOCUMENTS

2010/0051368 A1* 3/2010 Donnelly ............ B60L 15/2045
180/65.285

FOREIGN PATENT DOCUMENTS

JP    H09-156507 A    6/1997
JP    2013-230775 A   11/2013
(Continued)

OTHER PUBLICATIONS

PCT/ISA/210, "International Search Report for International Application No. PCT/JP2014/083110," dated Feb. 3, 2015.
(Continued)

*Primary Examiner* — Redhwan K Mawari
*Assistant Examiner* — Rodney P King
(74) *Attorney, Agent, or Firm* — Manabu Kanesaka; Benjamin Hauptman; Kenneth M. Berner

(57) ABSTRACT

An operating mode determining unit determines an operating mode of each of a plurality of vehicles to be either one of a normal operating mode and an energy saving mode on the basis of a necessary boarding and alighting time which is required to allow passengers to board or alight from the vehicles at each of a plurality of stations. An index value specifying unit specifies an index value on the basis of total energy consumption when the vehicles operate in the operating mode determined by the operating mode determining unit, a difference between the necessary boarding and alighting time and a boarding and alighting time, or the number of changing times of operating modes. An operating plan (Continued)

determining unit determines the operating mode of each of the vehicles to be an operating mode having a smallest index value.

7 Claims, 7 Drawing Sheets

(51) Int. Cl.
*B61L 27/00* (2006.01)
*B60L 15/40* (2006.01)
*B61L 3/00* (2006.01)
*B60L 9/02* (2006.01)
*B60L 11/18* (2006.01)
*B61L 25/02* (2006.01)

(52) U.S. Cl.
CPC ............... *B60L 15/40* (2013.01); *B61L 3/006* (2013.01); *B61L 15/0072* (2013.01); *B61L 15/0081* (2013.01); *B61L 27/0027* (2013.01); *B61L 27/0077* (2013.01); *B61L 25/021* (2013.01); *B61L 25/025* (2013.01); *B61L 2201/00* (2013.01); *Y02T 10/7005* (2013.01)

(58) Field of Classification Search
USPC .......................................................... 701/19
See application file for complete search history.

(56) References Cited

FOREIGN PATENT DOCUMENTS

JP 2013-247851 A 12/2013
JP 2013247851 A * 12/2013 .............. B61L 3/006

OTHER PUBLICATIONS

PCT/ISA/237 "Written Opinion of the International Searching Authority for International Application No. PCT/JP2014/083110," dated Feb. 3, 2015.

* cited by examiner

VEHICLE CONTROL DEVICE, TRANSPORT SYSTEM, VEHICLE CONTROL METHOD, AND PROGRAM

TECHNICAL FIELD

The present invention relates to a vehicle control device, a transport system, a vehicle control method, and a program thereof.

Priority is claimed on Japanese Patent Application No. 2014-061917, filed Mar. 25, 2014, the content of which is incorporated herein by reference.

BACKGROUND ART

In operation of a vehicle which runs on a track to load passengers, techniques of changing an operating mode of the vehicle depending on the number of passengers have been proposed. For example, Patent Literature 1 describes a technique of determining an inter-station operating speed of a vehicle toward a station at which the vehicle will stop next on the basis of information on the number of passengers at the station at which the vehicle will stop next.

CITATION LIST

Patent Literature

[Patent Literature 1]
Japanese Unexamined Patent Application, First Publication No. 2013-247851

SUMMARY OF INVENTION

Technical Problem

However, in the technique described in Patent Literature 1, since an operating mode is determined during operation of a vehicle, there is a problem with an increase in operational complexity and a decrease in passenger convenience.

The increase in operational complexity or the decrease in passenger convenience has a trade-off relationship with a decrease in energy consumption.

The present invention provides a vehicle control device, a transport system, a vehicle control method, and a program that can determine an operating mode with a balance between energy consumption and operational complexity or passenger convenience.

Solution to Problem

A first aspect provides a vehicle control device including an operating mode determining unit, an index value specifying unit, and an operating plan determining unit. The operating mode determining unit is configured to determine an operating mode of each of a plurality of vehicles to be either one of a normal operating mode, which is one operating mode, and an energy saving mode having less energy consumption and a longer operating time than the normal operating mode on the basis of a necessary boarding and alighting time which is required to allow passengers to board or alight from the vehicles at each of a plurality of stopping positions. The index value specifying unit is configured to specify an index value which increases as total energy consumption increases when the vehicles operate in the operating mode determined by the operating mode determining unit. The operating plan determining unit is configured to determine the operating mode of each of the vehicles to be an operating mode having a smallest index value.

A second aspect provides the vehicle control device according to the first aspect, wherein the operating mode determining unit is configured to determine the operating mode of the vehicles to be the energy saving mode when the necessary boarding and alighting time is shorter than a prescribed boarding and alighting time.

A third aspect provides the vehicle control device according to the first or second aspect, wherein the operating mode determining unit is configured to determine the operating mode to be the energy saving mode when all the necessary boarding and alighting times in an operating section of the vehicles are shorter than the prescribed boarding and alighting time.

A fourth aspect provides the vehicle control device according to any one of the first to third aspects, further including a necessary boarding and alighting time specifying unit that is configured to specify the necessary boarding and alighting time of the vehicles at each of the stopping positions on the basis of previous boarding and alighting information of the vehicles at the stopping position, wherein the operating mode determining unit is configured to determine the operating mode of each of the vehicles on the basis of the necessary boarding and alighting time specified by the necessary boarding and alighting time specifying unit.

A fifth aspect provides the vehicle control device according to any one of the first to fourth aspects, wherein the vehicles are configured to travel through an operating section including a plurality of stopping positions, and the operating mode determining unit determines the operating mode when the vehicles travel through the operating section.

A sixth aspect provides a transport system including: the vehicle control device according to any one of first to fifth aspects; and a vehicle that is configured to operate in an operating mode determined by the vehicle control device.

A seventh aspect provides the transport system according to the sixth aspect, wherein the vehicle is configured to estimate a boarding and alighting time at a next stopping position on the basis of a boarding rate of a preceding vehicle, and to determine the operating mode on the basis of the boarding and alighting time.

An eighth aspect provides a vehicle control method including: an operating mode determining step, an index value specifying step, and an operating plan determining step. The operating mode determining step is a step of determining an operating mode of each of a plurality of vehicles to be either one of a normal operating mode, which is one operating mode, and an energy saving mode having less energy consumption and a longer operating time than the normal operating mode on the basis of a necessary boarding and alighting time which is required to allow passengers to board or alight from the vehicles at each of a plurality of stopping positions. The index value specifying step is a step of specifying an index value which increases as total energy consumption increases when the vehicles operate in the determined operating mode. The operating plan determining step is a step of determining the operating mode of each of the vehicles to be an operating mode having a smallest index value.

A ninth aspect provides a program causing a computer to serve as: an operating mode determining unit, an index value specifying unit, and an operating plan determining unit. The operating mode determining unit is configured to determine an operating mode of each of a plurality of vehicles to be either one of a normal operating mode, which is one operating mode, and an energy saving mode having less energy consumption and a longer operating time than the normal operating mode on the basis of a necessary boarding and alighting time which is required to allow passengers to board or alight from the vehicles at each of a plurality of stopping positions. The index value specifying unit is configured to specify an index value which increases as total energy consumption increases when the vehicles operate in the operating mode determined by the operating mode determining unit. The operating plan determining unit is configured to determine the operating mode of each of the vehicles to be an operating mode having a smallest index value.

Advantageous Effects of Invention

According to at least one of the aspects, the vehicle control device determines an operating plan on the basis of an index value which is acquired in view of energy consumption, operational complexity, or passenger convenience. Accordingly, the vehicle control device can determine an operating mode with a balance between energy consumption and operational complexity or passenger convenience.

DESCRIPTION OF EMBODIMENTS

<First Embodiment>
[Overview]
Hereinafter, embodiments will be described in detail with reference to the accompanying drawings.

Figure 1:
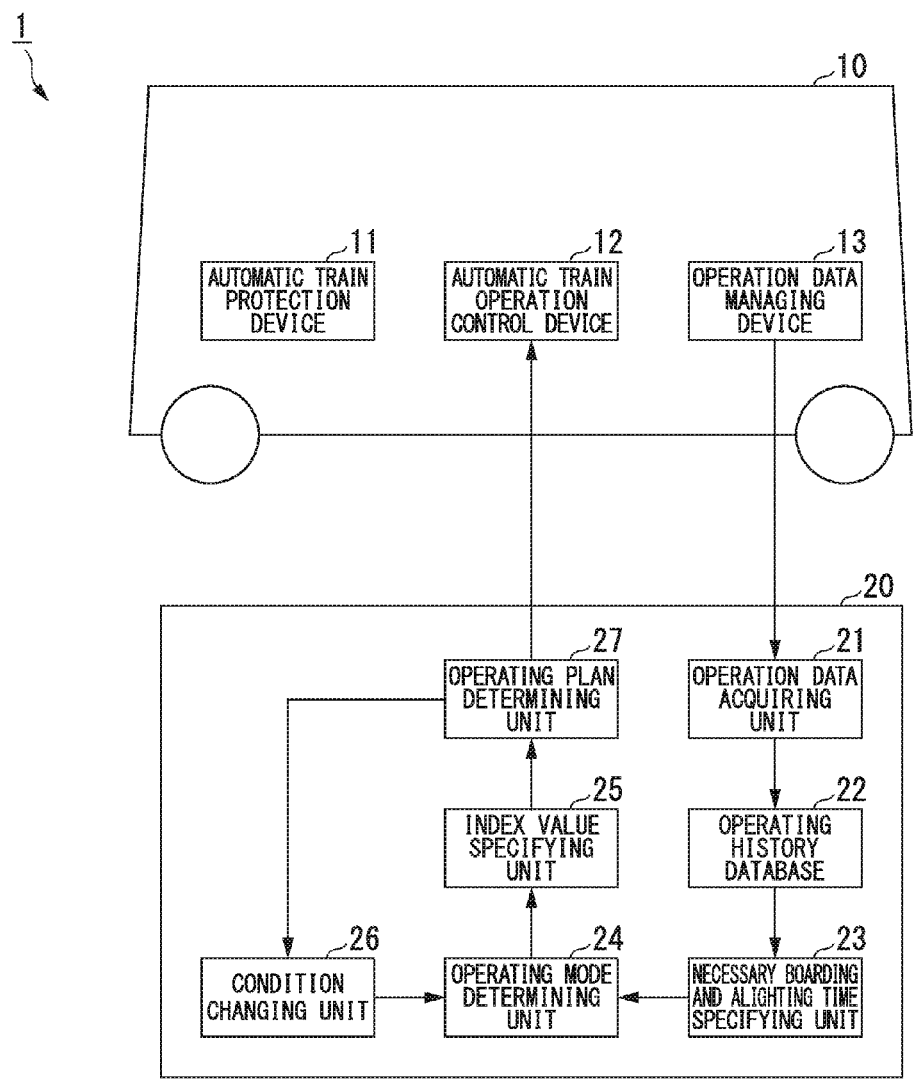
FIG. 1 is a schematic diagram illustrating a configuration of a transport system according to a first embodiment.

FIG. 1 is a schematic diagram illustrating a configuration of a transport system 1 according to a first embodiment.

The transport system 1 according to this embodiment includes a plurality of vehicles 10 that operate on a track and a vehicle control device 20 that controls operations of the vehicles 10. A plurality of stations is disposed on the track. A station is an example of a stopping position. The vehicles 10 stop at each station. Passengers board or alight from the vehicles 10 at the stations. The vehicles 10 operate with power supplied from an aerial wire.

Figure 2:
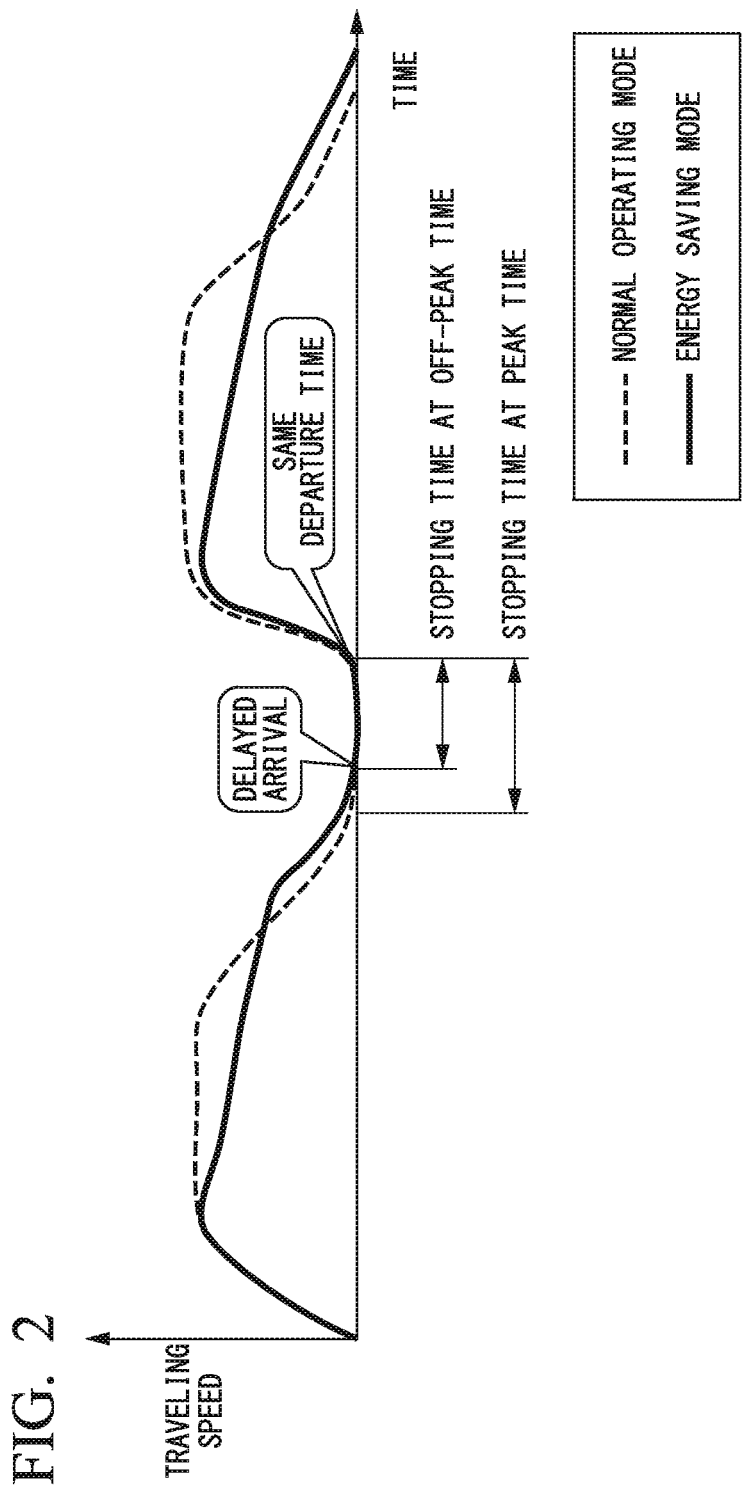
FIG. 2 is a diagram schematically illustrating the transport system according to the first embodiment.

FIG. 2 is a diagram schematically illustrating the transport system 1 according to the first embodiment.

The vehicle control device 20 generates an operating plan of each vehicle 10. The vehicle control device 20 causes the vehicle 10 to operate in an operating mode corresponding to the generated operating plan.

An operating mode is information indicating how the vehicle operates between stations. An operating mode in this embodiment includes two types of a normal operating mode which is a standard operating mode and an energy saving mode which has less energy consumption and a longer operating time than the normal operating mode. The normal operating mode is an operating mode in which the vehicle 10 is accelerated to a predetermined speed (a speed limit) after operation of the vehicle 10 is started, then the speed is maintained, and deceleration of the vehicle is started when the vehicle 10 reaches a predetermined position. The energy saving mode is an operating mode in which the vehicle 10 is accelerated to a predetermined speed after operation of the vehicle 10 is started, the vehicle is made to coast when the speed of the vehicle 10 reaches a predetermined position, and deceleration of the vehicle is started when the vehicle 10 reaches the predetermined position. That is, the normal operating mode maintains speed by powering the vehicle 10 when the speed of the vehicle 10 reaches a predetermined speed, but the energy saving mode starts coasting when the speed of the vehicle 10 reaches a predetermined speed. Since energy consumption based on the powering of the vehicle 10 is not caused in the energy saving mode, energy consumption is less than that of the normal operating mode. On the other hand, since the speed slowly decreases at while coasting, a time until the vehicle arrives at a station in the energy saving mode is longer than that in the normal operating mode.

The vehicle 10 according to this embodiment operates in either one operating mode of the normal operating mode and the energy saving mode. When the number of passengers boarding and the number of passengers alighting at a station are small (at an off-peak time), a time required for boarding and alighting may be sufficiently shorter than a standard stopping time. In this case, the vehicle control device 20 can even secure the time required for boarding and alighting by causing the vehicle 10 to operate in the energy saving mode between the station and a previous station thereof to shorten the stopping time as illustrated in FIG. 2. On the other hand, when the number of passengers boarding and the number of passengers alighting are large (at a peak time), the vehicle control device 20 can sufficiently secure the time required for boarding and alighting by causing the vehicle 10 to operate in the normal operating mode between the station and the previous station thereof.

As a result, the vehicle control device 20 can reduce power consumption of the vehicle 10 without damaging passenger convenience.

Configurations of the vehicle 10 and the vehicle control device 20 according to the first embodiment will be described below with reference to FIG. 1.

[Configuration of Vehicle 10]
The vehicle 10 includes an automatic train protection (ATP) device 11, an automatic train operation (ATO) control device 12, and an operation data managing device 13.

The ATP device 11 is a device that automatically stops or decelerates the vehicle 10 when the vehicle 10 tries to move past a stop signal or when the speed of the vehicle 10 is higher than a predetermined speed.

The ATO control device 12 causes the vehicle 10 to operate in an operating mode acquired from the vehicle control device 20.

The operation data managing device 13 collects data associated with the operation of the vehicle 10. The operation data managing device 13 transmits the data associated with the operation of the vehicle 10 to the vehicle control device 20. The data associated with the operation of the vehicle 10 includes, for example, a station-stopped-vehicle occupancy, a station-departing-vehicle occupancy, a boarding and alighting time, and a stopping time for each station.

The ATP device 11 and the ATO control device 12 specify a position of the vehicle 10 and control a speed of the vehicle 10 on the basis of the specified position. The ATP device 11 and the ATO control device 12 specify the position of the vehicle 10 by communicating with a ground unit installed on the ground. The ground unit transmits information indicating a position at which the ground unit is installed and information of a speed limit.

[Configuration of Vehicle Control Device 20]

The vehicle control device 20 includes an operation data acquiring unit 21, an operating history database 22, a necessary boarding and alighting time specifying unit 23, an operating mode determining unit 24, an index value specifying unit 25, a condition changing unit 26, and an operating plan determining unit 27. The vehicle control device 20 generates an operating plan of a day. The vehicle control device 20 transmits an operating mode associated with the operating plan to each vehicle 10. As a standard operating plan, a departure time of the vehicle 10 at each station and a circulation time through a track are determined. The standard operating plan is determined by departure times and the circulation time when each vehicle 10 operates in the normal operating mode between all of the stations and stops for a predetermined time (for example, 30 seconds) at each station.

The operation data acquiring unit 21 collects data associated with the operation of each vehicle 10 from the operation data managing device 13 of the vehicle 10, and stores the collected data in the operating history database 22.

The operating history database 22 stores data associated with a previous operation of the vehicle 10. The operating history database 22 stores a date, a day of the week, information indicating whether the day is a holiday, information of an event of the day, time, station names, a moving direction, a station-stopped-vehicle occupancy, a station-departing-vehicle occupancy, a boarding and alighting time, and a stopping time at a station in correlation with each other. Among these, the time, the station names, the station-stopped-vehicle occupancy, the station-departing-vehicle occupancy, the boarding and alighting time, and the stopping time at a station are information transmitted from the operation data managing device 13.

The necessary boarding and alighting time specifying unit 23 predicts a necessary boarding and alighting time at each station at each departure time determined in the standard operating plan on the basis of the information stored in the operating history database 22.

The necessary boarding and alighting time specifying unit 23 predicts the necessary boarding and alighting time on the basis of, for example, a Bayesian model, a K-means algorithm, or another prediction algorithm. An example of the method of calculating a necessary boarding and alighting time is a method of calculating a necessary boarding and alighting time by causing the necessary boarding and alighting time specifying unit 23 to predict the number of passengers boarding and the number of passengers alighting for each station at each departure time and adding a value obtained by multiplying the number of passengers boarding by the time required for the boarding of each passenger and a value obtained by multiplying the number of passengers alighting by the time required for the alighting of each passenger.

The operating mode determining unit 24 determines an operating mode of each vehicle 10 on the basis of the necessary boarding and alighting time predicted by the necessary boarding and alighting time specifying unit 23. Specifically, the operating mode determining unit 24 determines the operating mode of the vehicle 10 to be the energy saving mode when the necessary boarding and alighting time at each station while the vehicle 10 travels on the track is shorter than a prescribed boarding and alighting time (for example, 15 seconds). The operating mode determining unit 24 determines the operating mode of the vehicle 10 to be the normal operating mode when the necessary boarding and alighting time at each station while the vehicle 10 travels on the track is longer than or equal to the prescribed boarding and alighting time. The prescribed boarding and alighting time is set to be smaller than a value obtained by subtracting a variation tolerance (a margin) of the boarding and alighting time (5 seconds in this embodiment) from a stopping time in a reference operating plan (30 seconds in this embodiment) (that is, smaller than 25 seconds in this embodiment). The prescribed boarding and alighting time is set to be greater than or equal to a value obtained by subtracting a difference in operating time between the normal operating mode and the energy saving mode (15 seconds in this embodiment) from the stopping time in the reference operating plan (that is, greater than or equal to 15 seconds).

The index value specifying unit 25 calculates an index value of an operating mode on the basis of total power consumption (total energy consumption) when the vehicle 10 operates in the operating mode determined by the operating mode determining unit 24, an operational complexity index, and a passenger convenience index. The operational complexity index is a value indicating an operational complexity of the ATO control device 12 and has a higher value as a frequency of changing the operating modes becomes higher. The passenger convenience index is a value indicating convenience of the transport system 1 to passengers when the operating plan is employed and has a higher value as the difference between the boarding and alighting time (the stopping time) and the necessary boarding and alighting time when the vehicle 10 operates in the operating mode determined by the operating mode determining unit 24 increases and the vehicle occupancy or the waiting time increases.

The condition changing unit 26 changes the prescribed boarding and alighting time which is used for the operating mode determining unit 24 to determine the operating mode.

The operating plan determining unit 27 employs an operating plan associated with a minimum index value among the index values calculated on the basis of other prescribed boarding and alighting times as the operating plan of the vehicle 10 of the day. The operating plan determining unit 27 transmits the operating mode associated with the employed operating plan to the ATO control device 12 of the vehicle 10.

[Operation]

An operation of the vehicle control device 20 according to this embodiment will be described below.

Figure 3:
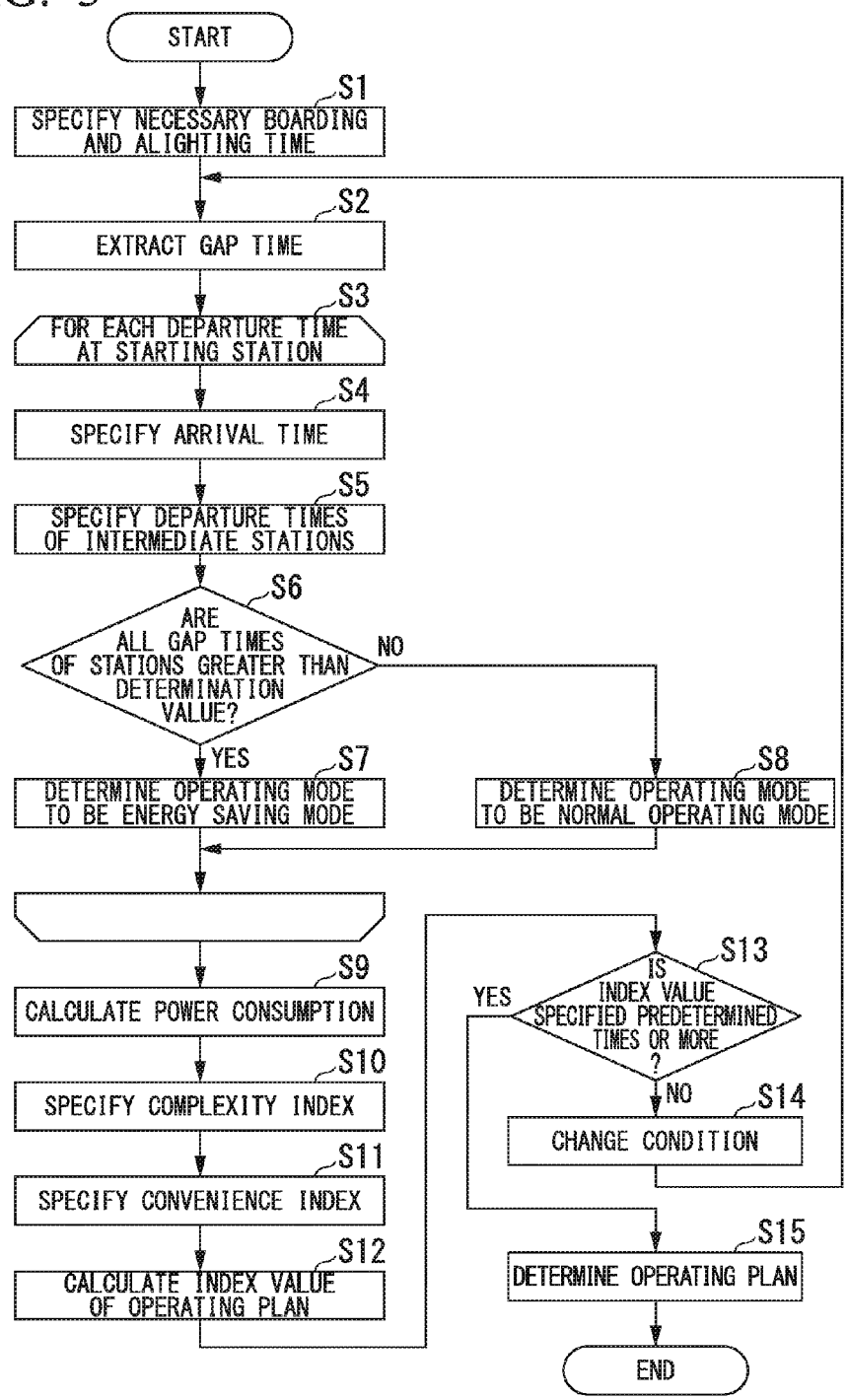
FIG. 3 is a flowchart illustrating an operation of a vehicle control device according to the first embodiment.

FIG. 3 is a flowchart illustrating an operation of the vehicle control device 20 according to the first embodiment.

Figure 4A:
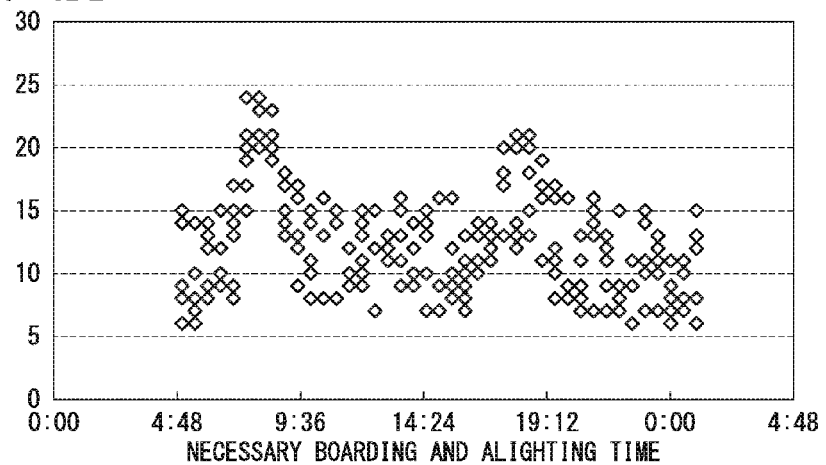
FIG. 4A is a diagram illustrating an example of data which is handled by the vehicle control device according to the first embodiment.
Figure 4B:
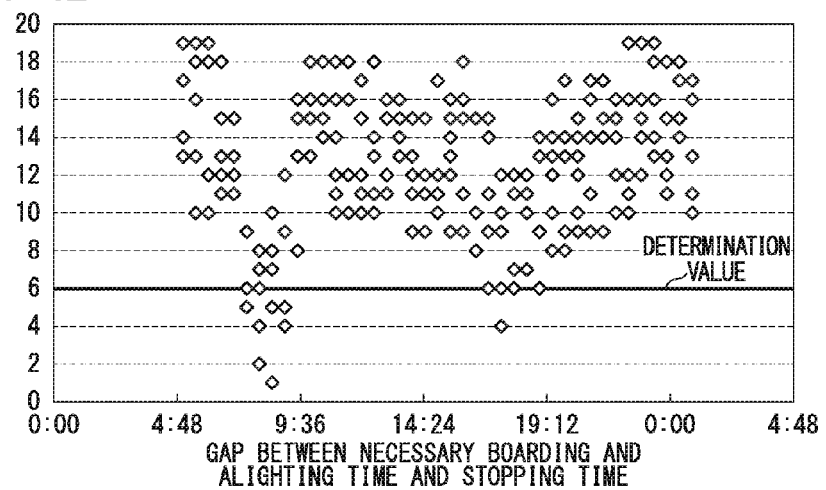
FIG. 4B is a diagram illustrating an example of data which is handled by the vehicle control device according to the first embodiment.
Figure 4C:
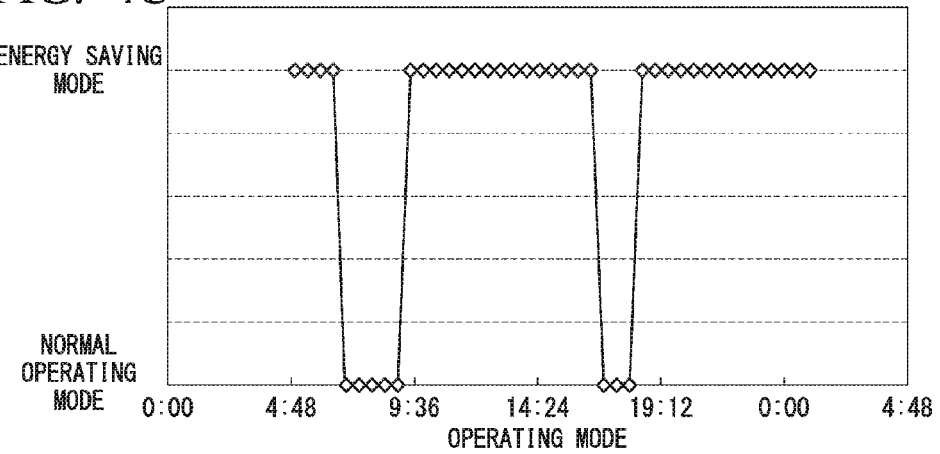
FIG. 4C is a diagram illustrating an example of data which is handled by the vehicle control device according to the first embodiment.

FIGS. 4A, 4B, and 4C are diagrams illustrating examples of data which is handled by the vehicle control device 20 according to the first embodiment.

The vehicle control device 20 prepares an operating plan before the first departure of each day.

First, the necessary boarding and alighting time specifying unit 23 specifies a necessary boarding and alighting time of passengers for each station at each time of the day to prepare the operating plan on the basis of the data associated with a previous operation of the vehicle 10 which is stored in the operating history database 22 (step S1). FIG. 4A is a diagram illustrating an example of a specified result of the necessary boarding and alighting time at each time. Points plotted at the same time in FIG. 4A indicate different stations.

Then, the operating mode determining unit 24 calculates a gap time between the necessary boarding and alighting time and a stopping time at each station at each time on the basis of the necessary boarding and alighting time specified by the necessary boarding and alighting time specifying unit 23 and a margin of boarding time (step S2). The gap time is a value obtained by subtracting the necessary boarding and alighting time and the margin from the stopping time.

Then, the operating mode determining unit 24 sequentially selects a departure time of the vehicle 10 at a starting station and performs processes of steps S4 to S8 which will be described below (step S3).

First, the operating mode determining unit 24 specifies a time at which the vehicle 10 ends its circulation on the track (an arrival time) for each departure time selected in step S3 on the basis of a circulation time which is required to travel the vehicle 10 on the track in a standard operating plan (step S4). That is, in this embodiment, a section after the vehicle 10 departs from the starting station until the vehicle 10 returns to the starting station is an operating section of the vehicle 10.

Then, the operating mode determining unit 24 specifies departure times at each station through which the vehicle 10 passes from the departure times selected in step S3 to the arrival time (step S5). Then, the operating mode determining unit 24 determines whether all gap times calculated in step S2 for the specified departure times are greater than a predetermined determination value (step S6). Comparison of the gap times with the predetermined determination value is equivalent to comparison of the necessary boarding and alighting time with the prescribed boarding and alighting time. That is, a determination value corresponds to a value obtained by subtracting the prescribed boarding and alighting time and the margin from the stopping time. FIG. 4B is a diagram illustrating an example of a gap between the necessary boarding and alighting time and the stopping time for each time. Points plotted at the same time in FIG. 4B indicate different stations.

When it is determined that all the gap times are greater than the predetermined determination value (YES in step S6), the operating mode determining unit 24 determines an operating mode while the vehicle 10 travels on the track one time to be an energy saving mode (step S7). On the other hand, when at least one gap time is less than or equal to the predetermined determination value (NO in step S6), the operating mode determining unit 24 determines an operating mode while the vehicle 10 travels on the track one time to be a normal operating mode (step S8).

In this way, the operating mode determining unit 24 determines the operating mode of the vehicle 10 for each circulation (for each operating section). Accordingly, since the operating mode is not changed while the vehicle 10 travels on the track one time, the vehicle control device 20 can achieve a simplification of the operation. FIG. 4C is a diagram illustrating a relationship between a departure time of the vehicle 10 at a starting station and the operating mode thereof.

When the operating mode determining unit 24 determines the operating mode of the vehicle 10 departing at all the departure times of the starting station, the index value specifying unit 25 calculates power consumption when each vehicle 10 operates in the operating mode determined by the operating mode determining unit 24 (step S9). The power consumption is calculated, for example, on the basis of a vehicle weight which is calculated on the basis of the number of passengers boarding and the number of passengers alighting at each station calculated to specify the necessary boarding and alighting time by the necessary boarding and alighting time specifying unit 23.

Then, the index value specifying unit 25 specifies the number of changing times of the operating modes determined by the operating mode determining unit 24 as an operational complexity index (step S10). The number of changing times of the operating modes is the sum of the number of times that the operating mode of each vehicle 10 changes from the normal operating mode to the energy saving mode and vice versa.

In this embodiment, the operating mode is not changed while the vehicle 10 travels on the track one time. Accordingly, the changing of the operating mode occurs at a time at which the vehicle 10 departs from the starting station after circulating on the track one time.

Then, the index value specifying unit 25 specifies the total sum of differences between the necessary boarding and alighting time calculated in step S1 and the boarding and alighting time when the vehicle 10 operates in the operating mode determined by the operating mode determining unit 24 as a passenger convenience index (step S11). Then, the index value specifying unit 25 calculates the sum of the result values in which the calculated power consumption, the operational complexity index, and the passenger convenience index are multiplied by the respective weighting coefficients corresponding to the calculated power consumption, the operational complexity index, and the passenger convenience index as an index value of the operating plan (step S12). Each of the weighting coefficients of the calculated power consumption, the operational complexity index, and the passenger convenience index is appropriately set by a manager of the transport system 1. For example, when power consumption or passenger convenience is thought to be more important than operational complexity, the manager of the transport system 1 sets the weighting coefficient of the operational complexity index to be lower and sets the weighting coefficients of the power consumption and the passenger convenience index to be higher.

Then, the operating plan determining unit 27 determines whether the index value has been specified a predetermined number of times or more by the index value specifying unit 25 (step S13). When the operating plan determining unit 27 determines that the index value has been specified less than the predetermined number of times by the index value specifying unit 25 (NO in step S13), the condition changing unit 26 changes conditions associated with the determination of the operating mode (step S14). The conditions associated with the determination of the operating mode are the margin of the boarding time and the determination value. Changing the margin of the boarding time or the determination value is equivalent to changing the prescribed boarding and alighting time. The flow is returned to the step S2, and the operating mode determining unit 24 re-determines the operating mode of each vehicle 10.

On the other hand, when the operating plan determining unit 27 determines that the index value has been specified the predetermined number of times or more by the index value specifying unit 25 (YES in step S13), a combination in which the index value specified by the index value specifying unit 25 is the minimum among combinations of operating modes determined by the operating mode determining unit 24 is determined to be an operating plan of the day (step S15). Accordingly, the operating plan determining unit 27 can generate an operating plan with a balance among power consumption, operational complexity, and passenger convenience. The operating plan determining unit 27 transmits the generated operating plan to the vehicle 10. Accordingly, the vehicle 10 can operate in the operating mode based on the operating plan with a balance among power consumption, operational complexity, and passenger convenience.

<Second Embodiment>

[Overview]

The transport system 1 according to a second embodiment will be described below.

In the transport system 1 according to the first embodiment, the vehicle control device 20 generates an operating plan with a balance among power consumption, operation complexity, and passenger convenience and a vehicle 10 operates in accordance with the operating plan. In the transport system 1 according to the second embodiment, the ATO control device 12 of each vehicle 10 performs a calculation in real time on the basis of an operating plan generated by the vehicle control device 20 and changes its operating mode.

Figure 5:
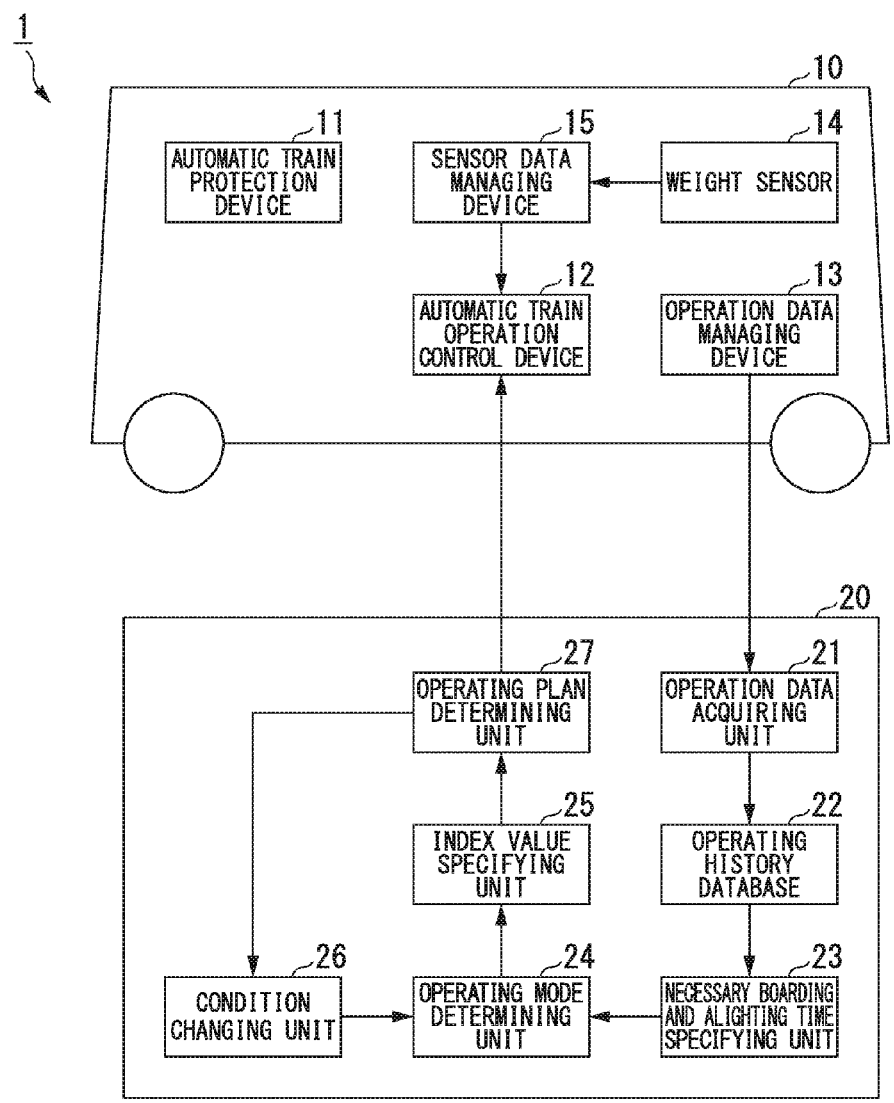
FIG. 5 is a schematic block diagram illustrating a configuration of a transport system according to a second embodiment.

FIG. 5 is a schematic block diagram illustrating a configuration of the transport system 1 according to the second embodiment.

The vehicle 10 in the second embodiment further includes a weight sensor 14 and a sensor data managing device 15 in addition to the configuration of the first embodiment.

The weight sensor 14 measures a weight of the vehicle 10.

The sensor data managing device 15 manages the weight measured by the weight sensor 14 and a weight measured by the vehicle 10 (hereinafter, referred to as a preceding vehicle) operating in front of the vehicle 10 equipped with the device (hereinafter, referred to as a vehicle of interest).

[Operation]

An operation of the transport system 1 according to the second embodiment will be described below.

Figure 6:
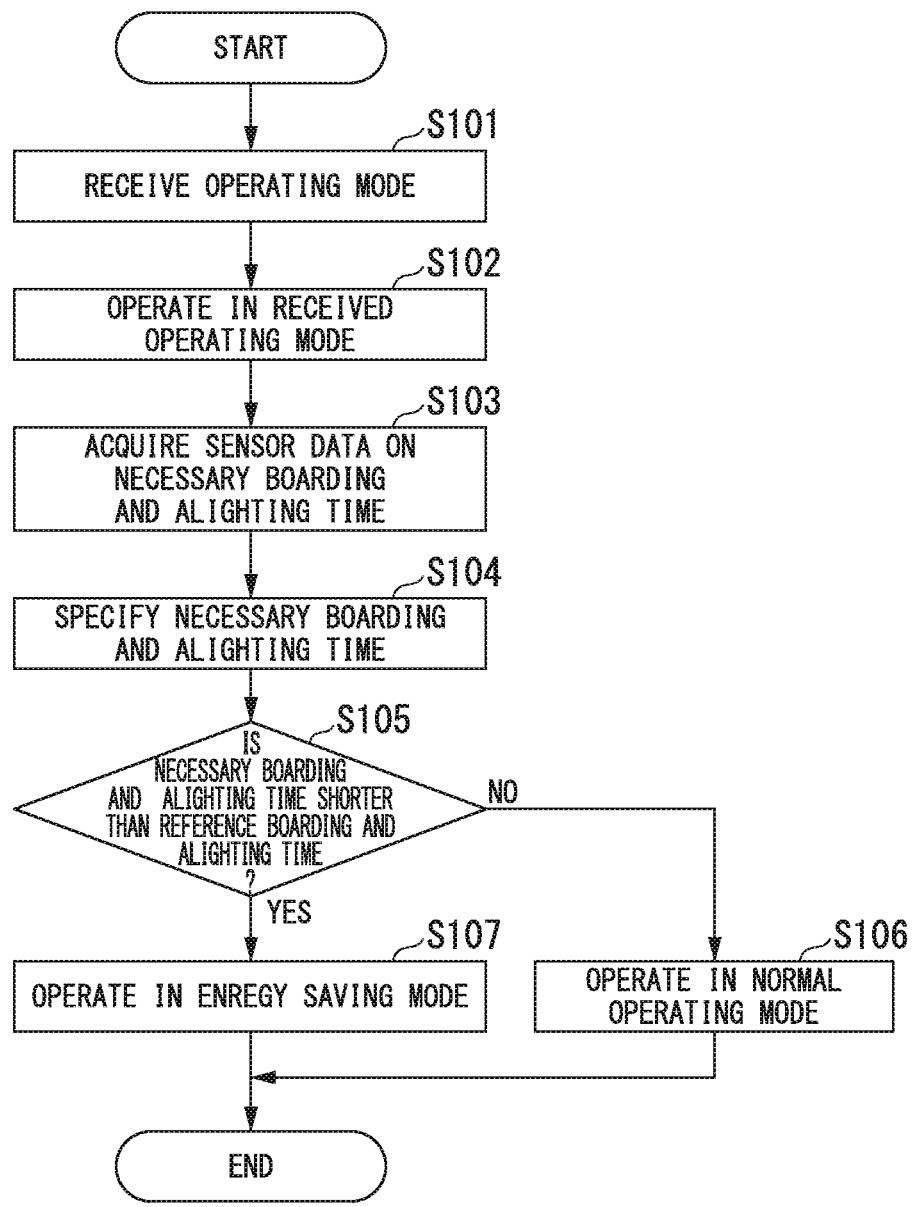
FIG. 6 is a flowchart illustrating an operation of an ATO control device according to the second embodiment.

FIG. 6 is a flowchart illustrating an operation of the ATO control device 12 according to the second embodiment.

When it is a departure time of a vehicle 10, the ATO control device 12 receives an operating mode from the vehicle control device 20 (step S101). The ATO control device 12 causes the vehicle 10 to operate in the operating mode (step S102).

The sensor data managing device 15 acquires sensor data on a necessary boarding and alighting time from a preceding vehicle (step S103). Examples of the sensor data on the necessary boarding and alighting time include the number of passengers boarding and the number of passengers alighting and the boarding and alighting time. The number of passengers boarding and the number of passengers alighting are acquired by counting the number of passengers boarding and the number of passengers alighting, for example, using motion sensors, cameras, or the like which are disposed at doors of the preceding vehicle. The boarding and alighting time is acquired by counting a time from a time at which passengers are sensed, for example, by the motion sensors, the cameras, or the like which are disposed at the doors of the preceding vehicle to a time at which the sensing of passengers ends. Then, the ATO control device 12 specifies the necessary boarding and alighting time on the basis of the sensor data acquired by the sensor data managing device 15 (step S104).

Then, the ATO control device 12 determines whether the specified necessary boarding and alighting time is shorter than a reference boarding and alighting time (step S105). The reference boarding and alighting time which is used by the ATO control device 12 may be a time different from the reference boarding and alighting time which is used by the vehicle control device 20.

When it is determined that the specified necessary boarding and alighting time is longer than or equal to the reference boarding and alighting time (NO in step S105), the ATO control device 12 causes the vehicle of interest to operate in the operating mode determined by the vehicle control device 20 (step S106). On the other hand, when it is determined that the specified necessary boarding and alighting time is shorter than the reference boarding and alighting time (YES in step S105), the ATO control device 12 causes the vehicle of interest to operate in an energy saving mode (step S107).

As described above, in the transport system 1 according to this embodiment, the ATO control device 12 of each vehicle 10 performs calculation in real time on the basis of the operating plan generated by the vehicle control device 20 and changes the operating mode. Accordingly, the ATO control device 12 can achieve energy saving in operation with higher accuracy without damaging the entire operation of the transport system 1.

While embodiments have been described above in detail with reference to the drawings, a specific configuration is not limited to the above-mentioned configurations but can be subjected to various modifications in design and the like.

For example, in the above-mentioned embodiments, two types of the normal operating mode and the energy saving mode are used as the operating modes, but the present invention is not limited to this configuration. For example, in another embodiment, a plurality of energy saving modes having different operating times and different power consumptions may be calculated and an appropriate operating mode corresponding to a waiting time may be selected.

In the above-mentioned embodiments, the operating mode is changed to the energy saving mode when all the boarding and alighting times at each of the stations in circulation are short, but the present invention is not limited to this configuration. For example, in another embodiment, the operating mode may be determined for each inter-station operation. In this case, there is a possibility of the operating mode changing for each inter-station operation and thus the operational complexity index increases.

In the above-mentioned embodiments, the operating mode is controlled so as not to change the departure time at each station which is determined in the standard operating plan, but the present invention is not limited to this configuration. For example, in another embodiment, the departure time may be delayed by a predetermined allowable time from a predetermined departure time. In this case, the operational complexity index has a higher value as the number of changing departure time increases or as the delay time increases. When there is a high probability of waiting for a traffic light due to a delay of the departure time of the preceding vehicle, the ATO control device 12 of a subsequent vehicle may change its operating mode to the energy saving mode regardless of the necessary boarding and alighting time.

In the above-mentioned embodiments, the necessary boarding and alighting time specifying unit 23 specifies the necessary boarding and alighting time on the basis of the information stored in the operating history database 22, but the present invention is not limited to this configuration. A ticket gate of each station can specify a boarding station and an alighting station from a ticket or a commuting ticket. Therefore, for example, in another embodiment, the necessary boarding and alighting time may be specified on the basis of the number of passengers boarding and the number of passengers alighting at each station which is specified by data collected by the ticket gates of the stations.

In the above-mentioned embodiments, the necessary boarding and alighting time specifying unit 23 specifies the necessary boarding and alighting time on the basis of the number of passengers boarding and the number of passengers alighting at each station, but the present invention is not limited to this configuration. Even when the number of passengers boarding and the number of passengers alighting are the same, the time required for the passengers boarding and alighting may increase as the vehicle occupancy of the vehicle 10 increases. Therefore, in another embodiment, the necessary boarding and alighting time specifying unit 23 may specify the necessary boarding and alighting time on the basis of the number of passengers boarding and the number of passengers alighting at each station and the vehicle occupancy. Similarly to the second embodiment, the ATO control device 12 may specify the necessary boarding and alighting time on the basis of the number of passengers boarding and the number of passengers alighting at each station and the vehicle occupancy.

In the second embodiment, the ATO control device 12 specifies the necessary boarding and alighting time on the basis of the sensor data associated with the necessary boarding and alighting time of a preceding vehicle, but the present invention is not limited to this configuration. For example, the sensor data managing device 15 can acquire a relationship between the sensor data on the previous necessary boarding and alighting time and the previous boarding and alighting time at each station. In this case, the ATO control device 12 may estimate the previous boarding and alighting time associated with a value close to the sensor data on the necessary boarding and alighting time as the necessary boarding and alighting time at a station at which the vehicle of interest will stop next.

In the second embodiment, the ATO control device 12 causes a vehicle to operate in the operating mode determined by the vehicle control device 20 when the specified necessary boarding and alighting time is longer than or equal to the reference boarding and alighting time, and causes the vehicle to operate in the energy saving mode when the necessary boarding and alighting time is less than the reference boarding and alighting time. Accordingly, the ATO control device 12 can suppress the power consumption required for the operation, but the present invention is not limited to this configuration. For example, in another embodiment, when an operating company thinks that improvement of client convenience is more important than a decrease in power consumption, the ATO control device 12 causes the vehicle to operate in the normal operating mode when the specified necessary boarding and alighting time is longer than or equal to the reference boarding and alighting time, and may cause the vehicle to operate in the operating mode determined by the vehicle control device 20 when the necessary boarding and alighting time is less than the reference boarding and alighting time.

<Configuration of Computer>

Figure 7:
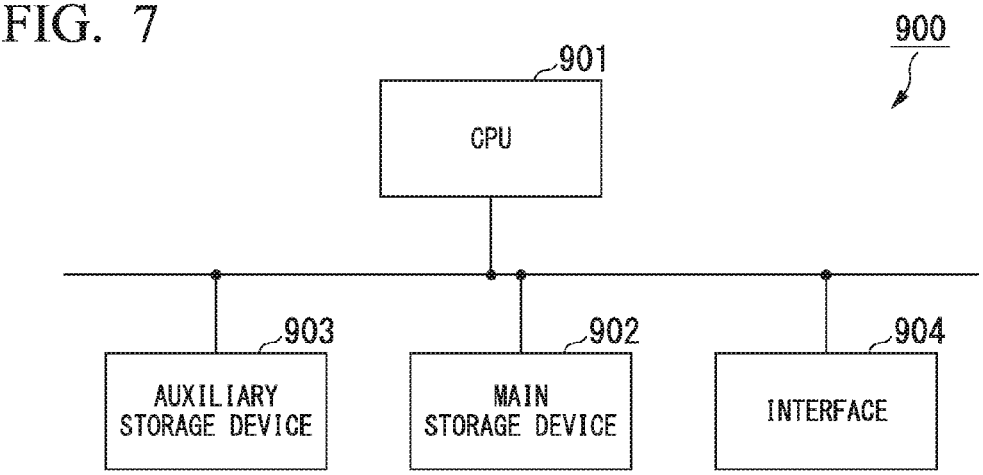
FIG. 7 is a schematic block diagram illustrating a configuration of a computer according to at least one embodiment.

FIG. 7 is a schematic block diagram illustrating a configuration of a computer 900 according to at least one of the above-mentioned embodiments.

The computer 900 includes a central processing unit (CPU) 901, a main storage device 902, an auxiliary storage device 903, and an interface 904.

The vehicle control device 20 and the ATO control device 12 are mounted on the computer 900. The operations of the above-mentioned processing units are stored in the form of a program in the auxiliary storage device 903. The CPU 901 reads the program from the auxiliary storage device 903, loads the program into the main storage device 902, and performs the above-mentioned processes in accordance with the program.

In at least one of the above-mentioned embodiments, the auxiliary storage device 903 is an example of non-transitory media. As other example, a magnetic disk, a magneto-optical disk, a compact disc read-only memory (CD-ROM), a digital versatile disc (DVD)-ROM, and a semiconductor memory can be used as non-transitory media, and the interface 904 is connected to the non-transitory media. When the program is transmitted to the computer 900 via a communication line, the computer 900 receiving the program may load it into the main storage device 902 and perform the above-mentioned processes.

The program may serve to realize a part of the above-mentioned functions.

The program may be a so-called differential file (a differential program) which realizes the above-mentioned functions in combination with another program stored in the auxiliary storage device 903.

INDUSTRIAL APPLICABILITY

The vehicle control device determines an operating plan on the basis of an index value which is acquired in view of energy consumption, and operational complexity or passenger convenience. Accordingly, the vehicle control device can determine an operating mode with a balance between energy consumption and operational complexity or passenger convenience.

REFERENCE SIGNS LIST

1 Transport system
10 Vehicle
11 Automatic train protection device
12 Automatic train operation control device
13 Operation data managing device
14 Weight sensor
15 Sensor data managing device
20 Vehicle control device
21 Operation data acquiring unit
22 Operating history database
23 Necessary boarding and alighting time specifying unit
24 Operating mode determining unit
25 Index value specifying unit
26 Condition changing unit
27 Operating plan determining unit
900 Computer
901 CPU
902 Main storage device
903 Auxiliary storage device
904 Interface

The invention claimed is:

1. A vehicle control device comprising:
an operating mode determining unit that is configured to determine an operating mode of each of a plurality of vehicles to be a normal operating mode when a necessary boarding and alighting time which is required to allow passengers to board or alight from the vehicles at each of a plurality of stopping positions is longer than or equal to a prescribed boarding and alighting time, and to determine the operating mode of each of a plurality of vehicles to be an energy saving mode having less energy consumption and a longer operating time than the normal operating mode when the necessary boarding and alighting time is shorter than the prescribed boarding and alighting time;
an index value specifying unit that is configured to specify an index value that is a sum of a value obtained by multiplying, by a first weighting coefficient, total energy consumption when the vehicles operate in the operating mode determined by the operating mode determining unit, a value obtained by multiplying, by a second weighting coefficient, the number of changing times of operating and a value obtained by multiplying, by a third weighting coefficient, a difference between a boarding and alighting time and the necessary boarding and alighting time when the vehicles operate in the operating mode;
a condition changing unit that changes the prescribed boarding and alighting time to other prescribed boarding and alighting times; and
an operating plan determining unit that is configured to determine the operating mode of each of the vehicles to be an operating mode having a smallest index value among the index values calculated on the basis of the prescribed boarding and alighting time and the other prescribed boarding and alighting times obtained by the condition changing unit.

2. The vehicle control device according to claim 1, further comprising a necessary boarding and alighting time specifying unit that is configured to specify the necessary boarding and alighting time of the vehicles at each of the stopping positions on the basis of previous operation information of the vehicles at the stopping position,
wherein the operating mode determining unit is configured to determine the operating mode of each of the vehicles on the basis of the necessary boarding and alighting time specified by the necessary boarding and alighting time specifying unit.

3. The vehicle control device according to claim 1, wherein the vehicles are configured to travel through the operating section including the plurality of stopping positions, and
the operating mode determining unit is configured to determine the operating mode when the vehicles travel through the operating section.

4. A transport system comprising:
the vehicle control device according to claim 1; and
a vehicle that is configured to operate in an operating mode determined by the vehicle control device.

5. The transport system according to claim 4, wherein the vehicle is configured to estimate a boarding and alighting time at a next stopping position on the basis of a boarding rate of a preceding vehicle, and to determine the operating mode on the basis of the boarding and alighting time.

6. A vehicle control method comprising:
an operating mode determining step of determining an operating mode of each of a plurality of vehicles to be a normal operating mode when a necessary boarding and alighting time which is required to allow passengers to board or alight from the vehicles at each of a plurality of stopping positions is longer than or equal to a prescribed boarding and alighting time, and determining the operating mode of each of a plurality of vehicles to be an energy saving mode having less energy consumption and a longer operating time than the normal operating mode when the necessary boarding and alighting time is shorter than the prescribed boarding and alighting time;
an index value specifying step of specifying an index value that is a sum of a value obtained by multiplying, by a first weighting coefficient, total energy consumption when the vehicles operate in the determined operating mode, a value obtained by multiplying, by a second weighting coefficient, the number of changing times of operating, and a value obtained by multiplying, by a third weighting coefficient, a difference between a boarding and alighting time and the necessary boarding and alighting time when the vehicles operate in the operating mode;
a condition changing step of changing the prescribed boarding and alighting time to other prescribed boarding and alighting times; and
an operating plan determining step of determining the operating mode of each of the vehicles to be an operating mode having a smallest index value among the index values calculated on the basis of the prescribed boarding and alighting time and the other prescribed boarding and alighting times obtained in the condition changing step.

7. A program causing a computer to function as:
an operating mode determining unit that is configured to determine an operating mode of each of a plurality of vehicles to be a normal operating mode when a necessary boarding and alighting time which is required to allow passengers to board or alight from the vehicles at each of a plurality of stopping positions is longer than or equal to a prescribed boarding and alighting time, and to determine the operating mode of each of a plurality of vehicles to be an energy saving mode having less energy consumption and a longer operating time than the normal operating mode when the necessary boarding and alighting time is shorter than the prescribed boarding and alighting time;
an index value specifying unit that is configured to specify an index value that is a sum of a value obtained by multiplying, by a first weighting coefficient, total energy consumption when the vehicles operate in the operating mode determined by the operating mode determining unit, a value obtained by multiplying, by a second weighting coefficient, the number of changing times of operating, and a value obtained by multiplying, by a third weighting coefficient, a difference between a boarding and alighting time and the necessary boarding and alighting time when the vehicles operate in the operating mode;
a condition changing unit that changes the prescribed boarding and alighting time to other prescribed boarding and alighting times; and
an operating plan determining unit that is configured to determine the operating mode of each of the vehicles to be an operating mode having a smallest index value among the index values calculated on the basis of the prescribed boarding and alighting time and the other prescribed boarding and alighting times obtained by the condition changing unit.

* * * * *